(12) United States Patent
Baruzzo

(10) Patent No.: US 9,493,204 B2
(45) Date of Patent: Nov. 15, 2016

(54) ADJUSTABLE SADDLE FOR MOTORCYCLES

(71) Applicant: PIAGGIO & C. S.p.A., Pisa (IT)

(72) Inventor: Maurizio Baruzzo, Pisa (IT)

(73) Assignee: PIAGGIO & C. S.P.A., Pisa (IT)

( * ) Notice: Subject to any disclaimer, the term of this patent is extended or adjusted under 35 U.S.C. 154(b) by 0 days.

(21) Appl. No.: 14/377,722

(22) PCT Filed: Feb. 22, 2013

(86) PCT No.: PCT/IB2013/051453
§ 371 (c)(1),
(2) Date: Aug. 8, 2014

(87) PCT Pub. No.: WO2013/124829
PCT Pub. Date: Aug. 29, 2013

(65) Prior Publication Data
US 2015/0175230 A1   Jun. 25, 2015

(30) Foreign Application Priority Data
Feb. 24, 2012   (IT) .............................. MI2012A0279

(51) Int. Cl.
*A47C 7/62* (2006.01)
*B62J 1/26* (2006.01)
*B62J 1/12* (2006.01)
*B62J 1/20* (2006.01)
*B62J 1/28* (2006.01)
(Continued)

(52) U.S. Cl.
CPC .. *B62J 1/26* (2013.01); *B62J 1/08* (2013.01); *B62J 1/12* (2013.01); *B62J 1/20* (2013.01); *B62J 1/28* (2013.01); *B62J 1/00* (2013.01); *B62J 1/002* (2013.01); *B62J 9/006* (2013.01)

(58) Field of Classification Search
CPC ................ B62J 1/18; B62J 1/22; B62J 1/20; B62J 9/006; B62J 1/12; B62J 1/08; B62J 1/28; B62J 1/26; B62J 1/00; B62J 1/002

USPC .............. 297/354.13, 215.12, 215.1, 215.11, 297/243, 214, 188.05, 195.13, 188.07, 297/188.08, 188.09, 188.12, 188.13
See application file for complete search history.

(56) References Cited

U.S. PATENT DOCUMENTS 3,712,670 A * 1/1973 Svehla et al. ................ 297/214
5,997,088 A * 12/1999 Stark et al. ............. 297/354.13
(Continued)

FOREIGN PATENT DOCUMENTS

| DE | 102004013529 A1 | 10/2005 |
|---|---|---|
| EP | 0718144 A1 | 6/1996 |
| JP | H06344964 A | 12/1994 |

OTHER PUBLICATIONS

Registered letter; European Patent Office; re: Application 13 716 419.0-1760, Applicant—Piaggo & C. S.p.A; dated Sep. 2, 2015; 6 pages.
(Continued)

*Primary Examiner* — Chi Q Nguyen
(74) *Attorney, Agent, or Firm* — Thomas Horstemeyer, LLP

(57) ABSTRACT

An adjustable saddle for motorcycles including a padded upper portion which constitutes the seat for the rider and/or the passenger of the motorcycle, and a substantially rigid bottom portion suitable for resting and attaching the saddle to the chassis or to the frame of the motorcycle. The bottom portion of the saddle at least one aperture is made for access to a respective compartment made inside the padded upper portion and is destined to receive one or more inserts or devices suitable for varying the height of the seat and/or the level of comfort for the rider and/or the passenger of the motorcycle. The aperture is made at the seat of the rider and/or passenger and is provided with a removable cover plate. The cover plate (22) is fitted with reversible means of attachment (24) to the bottom portion (14) of the saddle (10) to selectively open and close the aperture (18) and the respective compartment (20) so as to insert, add and/or remove the means (28; 30; 34; 46) suitable for varying the height of the seat and /or the level of comfort for the rider and /or the passenger of the motorcycle.

19 Claims, 15 Drawing Sheets

(51) Int. Cl.
  *B62J 1/08* (2006.01)
  *B62J 1/00* (2006.01)
  *B62J 9/00* (2006.01)

(56) References Cited

U.S. PATENT DOCUMENTS 6,623,071 B2 * 9/2003 Kawamoto et al. ..... 297/195.13
7,416,249 B2 * 8/2008 Atherley ................... 297/195.1
7,448,663 B2 * 11/2008 Fujimoto et al. ............... 296/63
7,556,114 B2 * 7/2009 Hanagan ....................... 180/219
7,604,292 B1 * 10/2009 Reading ................... 297/215.12
2006/0061157 A1 3/2006 Yokomizo

OTHER PUBLICATIONS

English translation of JPH053089U; 3 pages from the European Patent Office; printed Jul. 12, 2015.

* cited by examiner

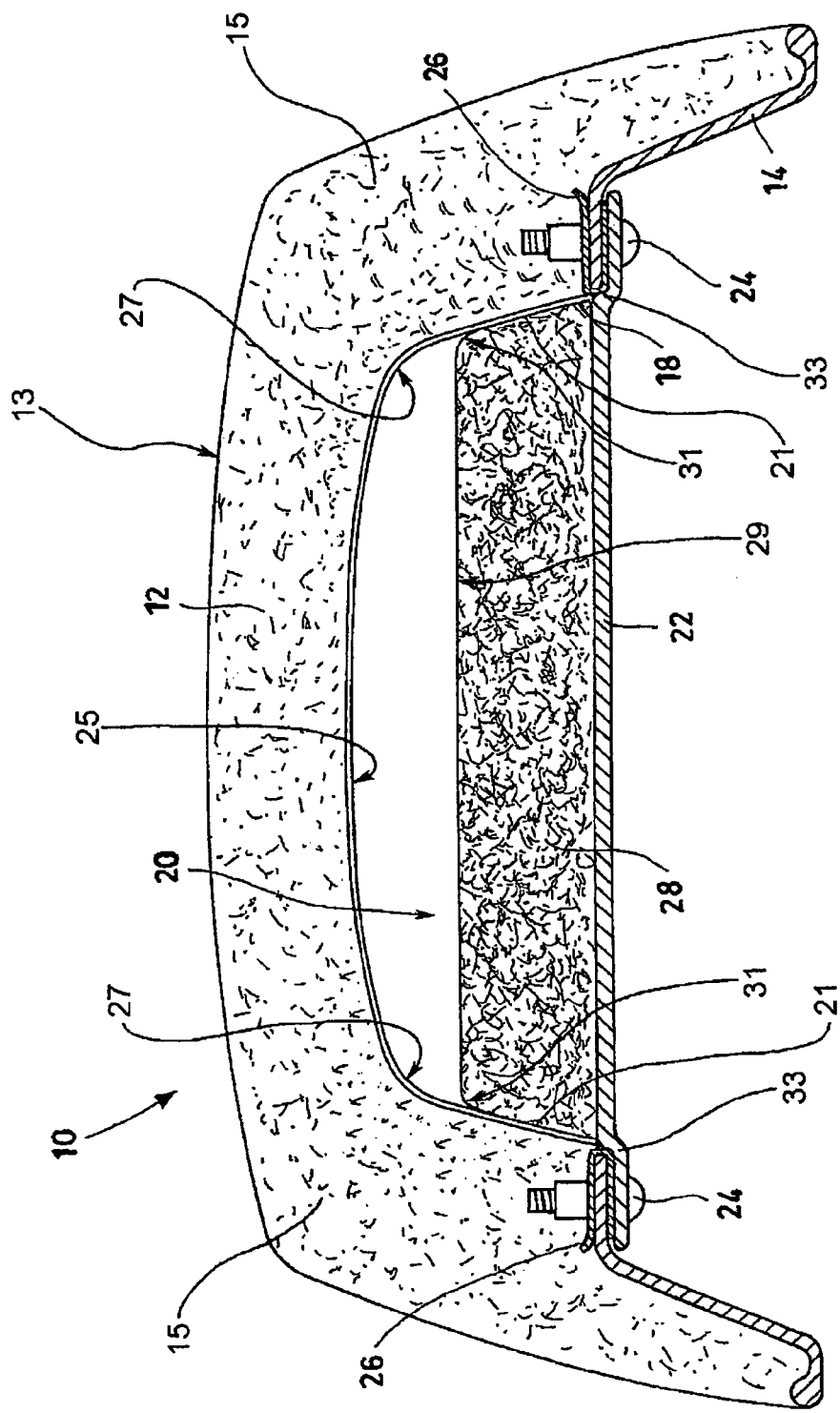

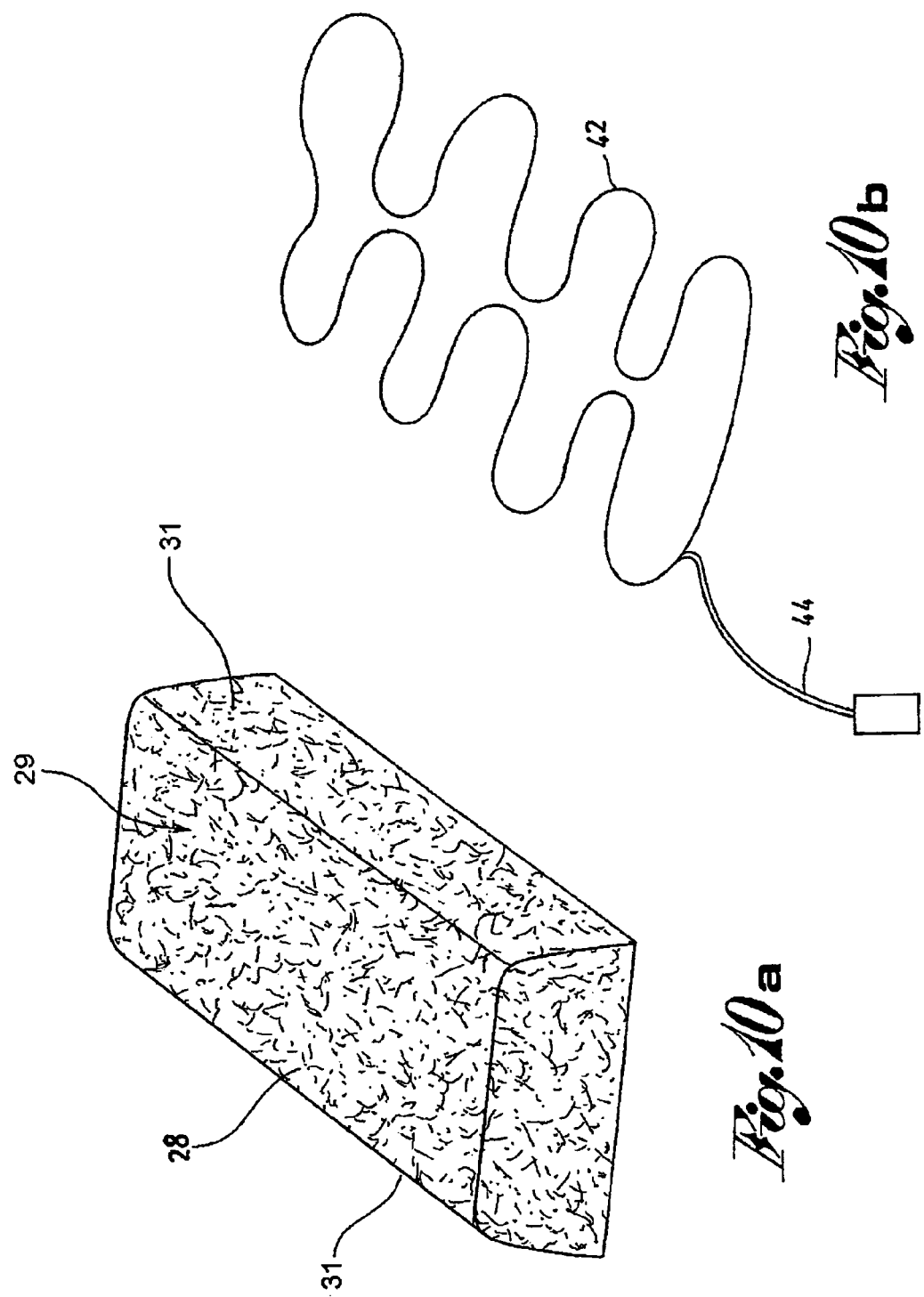

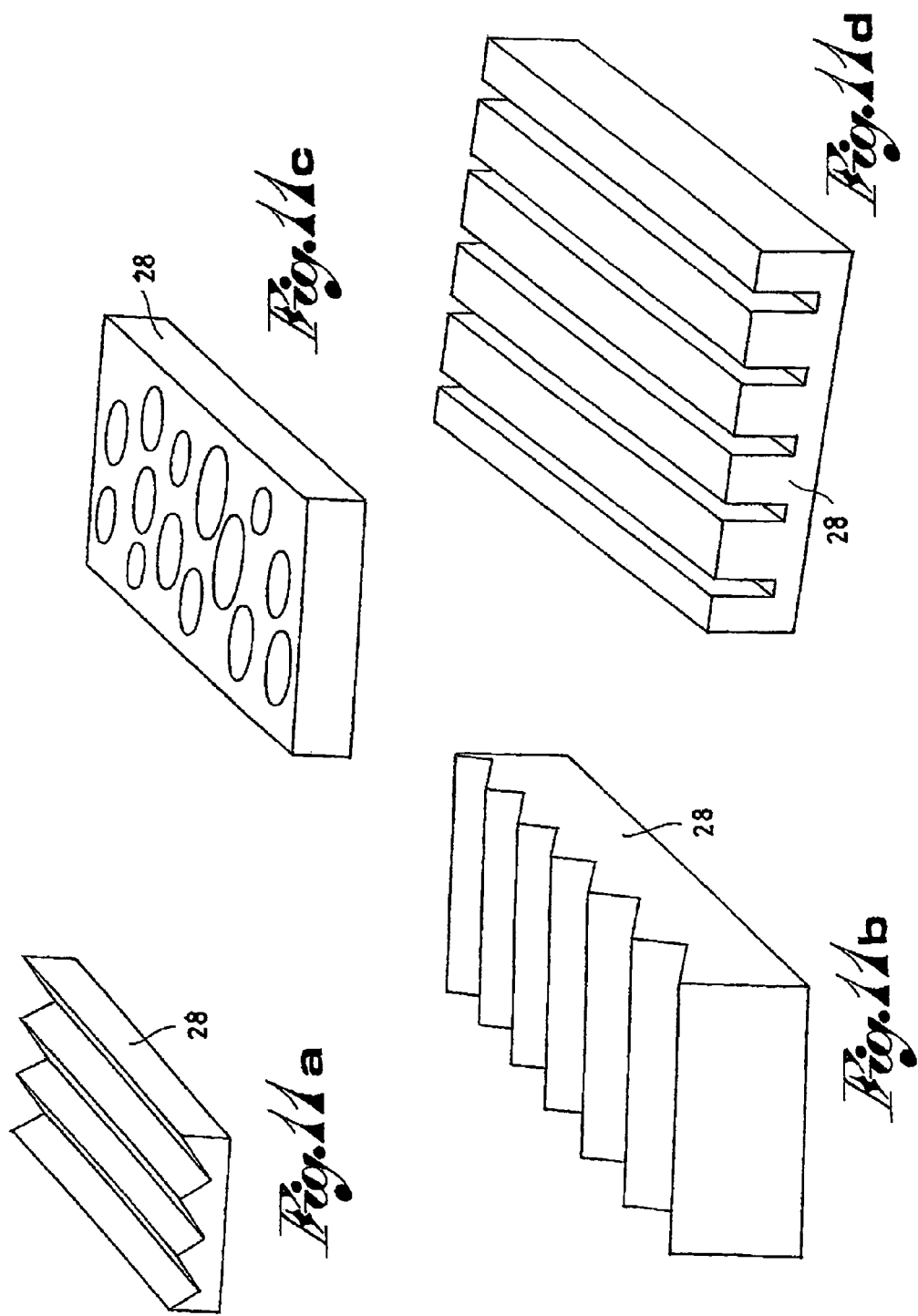

ADJUSTABLE SADDLE FOR MOTORCYCLES

CROSS-REFERENCE TO RELATED APPLICATION

This application is the 35 U.S.C. 0371 national stage of PCT Application No. PCT/IB2013/051453, filed Feb. 22, 2013, which is herein incorporated by reference in its entirety and which also claims priority to, and the benefit of, Italian Patent Application MI2012A000279, filed Feb. 24, 2012, which is herein incorporated by reference in its entirety.

BACKGROUND

The present invention relates to an adjustable saddle applicable in particular but not exclusively to motorcycles in general.

Traditional saddles for motorcycles are usually composed of a padded portion, usually manufactured from polyurethane foam and of support/attachment means of the saddle to the chassis or frame of the motorcycle. In addition to the traditional saddles, supplied as standard with the respective motorcycle and usually lacking adjustment systems, numerous types of so-called "comfort" saddles are currently present on the market, which are supplied as a subsequent aftermarket product or, in some cases, directly fitted on the motorcycle during the manufacture thereof.

The various types of so-called "comfort" saddles currently on sale differ in the specific function they perform. In fact saddles exist which can be lowered or raised compared to the basic saddle fitted as standard on the motorcycle. The variation of the position in height of the saddle in relation to the chassis or frame of the motorcycle may be obtained by simply using padding of greater or lesser thickness. In such case, a new saddle must be bought provided with the padding of the desired thickness whenever the height of the saddle needs to be adjusted.

Alternatively, the variation of the position in height of the saddle in relation to the chassis or frame of the motorcycle may be obtained by mechanical adjustment systems having various positions, or by acting on the support buffers of the saddle. However, both the mechanical adjustment systems of the height and intervention on the support buffers may cause the loss of coupling of the saddle to the underlying parts of the motorcycle (frame, plastic chassis, etc).

Other types of so-called "comfort" saddles currently on sale are designed, precisely, to improve the comfort of the motorcycle rider and/or passenger. Consequently saddles exist with gel inserts in the padding, heating means inserted in said padding, padding of variable density and so forth. In this case too, therefore, the user is forced to choose a new saddle each time depending on his/her specific comfort requirements.

The purpose of the present invention is consequently to make an adjustable saddle, applicable in particular but not exclusively to motorcycles in general, which is able to resolve the drawbacks mentioned above of the prior art in an extremely simple, economical and particularly functional manner.

In detail, it is a purpose of the present invention to make an adjustable saddle for motorcycles able to offer numerous possibilities of adjustment and customisation without the need to replace said saddle.

Another purpose of the present invention is to make an adjustable saddle for motorcycles wherein the adjustment and customisation operations are simple and intuitive.

Another purpose of the present invention to make an adjustable saddle for motorcycles which makes it possible to choose and modify at any moment both the height of the seat, and the level of comfort for the rider and/or passenger, as well as to reinstate any variations of the height and level of comfort following prolonged use of the saddle.

A further purpose of the present invention to make an adjustable saddle for motorcycles which always guarantees the correct coupling of said saddle to the various parts of the motorcycle (chassis/frame).

Another purpose of the present invention to make an adjustable saddle for motorcycles which guarantees the rider and passenger the same degree of safety as the "standard" saddle, fitted to the motorcycle during its manufacture.

These purposes according to the present invention are achieved by making an adjustable addle, applicable in particular but not exclusively to motorcycles in general, as disclosed.

Further characteristics of the invention are highlighted in the dependent claims, which form an integral part of the present description.

The characteristics and advantages of an adjustable saddle for motorcycles according to the present invention will be more clearly comprehensible from the description below, made by way of a non-limiting example, with reference to the appended schematic drawings, wherein:

BRIEF DESCRIPTION OF THE DRAWINGS

FIG. 1c shows a ground view from below of the saddle in FIG. 1a;

FIG. 1e is a transversal cross-section view which shows the basic components of an adjustable saddle for motorcycles according to one embodiment of the present invention;

FIGS. 3 to 10 show some preferred embodiments of the adjustable saddle for motorcycles according to the present invention;

FIGS. 10A, 10B and 11A-11D show some examples of embodiments of the internal components of the adjustable saddle for motorcycles according to the present invention.

DETAILED DESCRIPTION

Figure 1A:
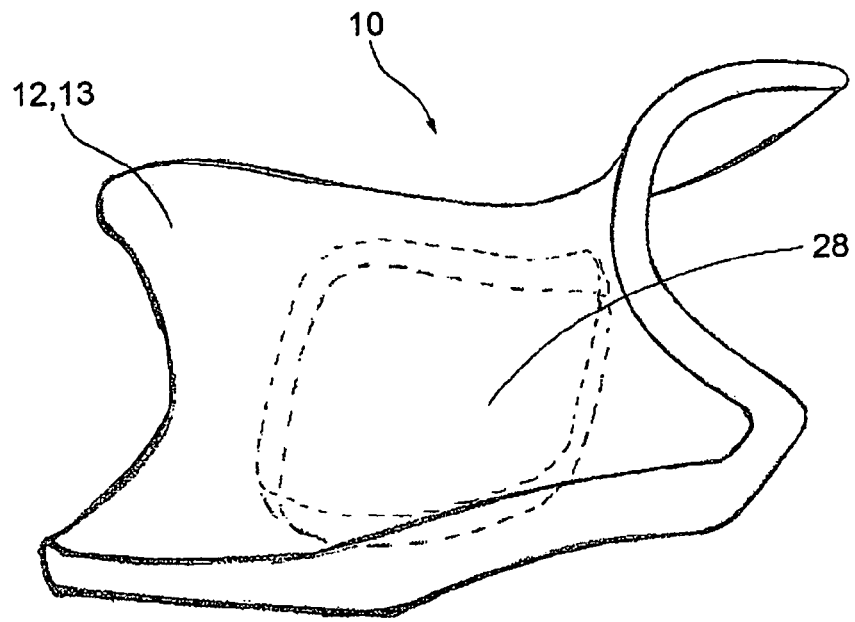
FIG. 1a is a perspective view of an adjustable saddle for motorcycles according to the present invention, in an assembled configuration.
Figure 1B:
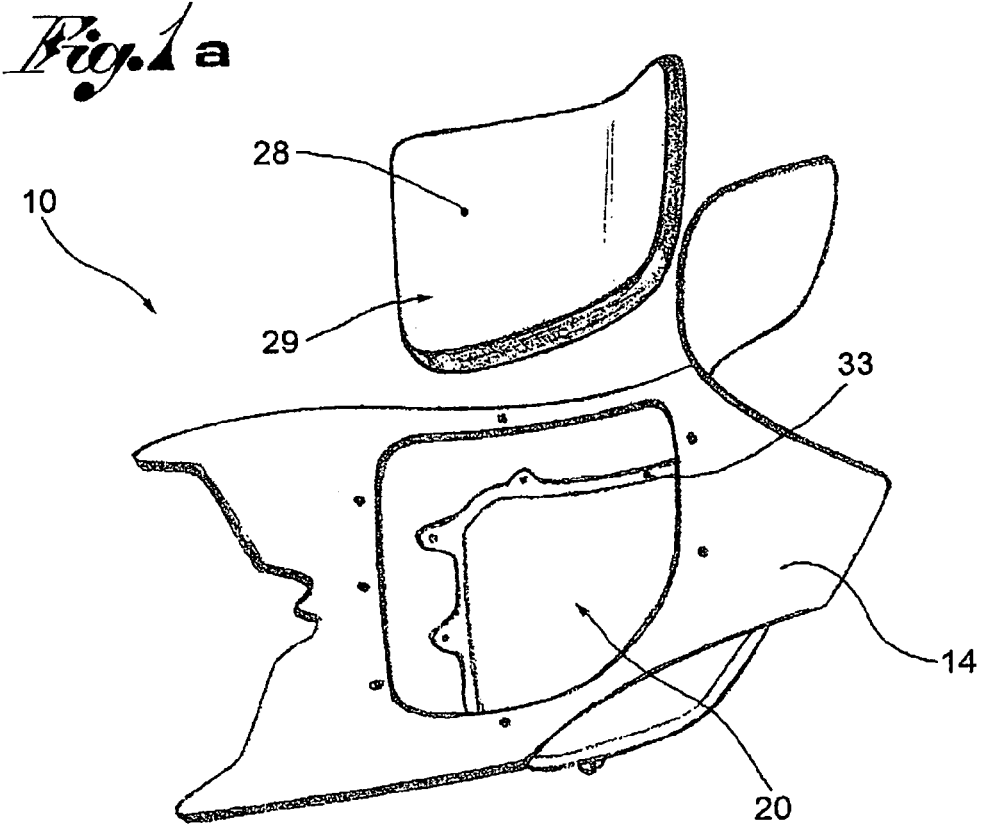
FIG. 1b is a perspective view of the saddle in FIG. 1a, in a configuration of separate parts.
Figure 1D:
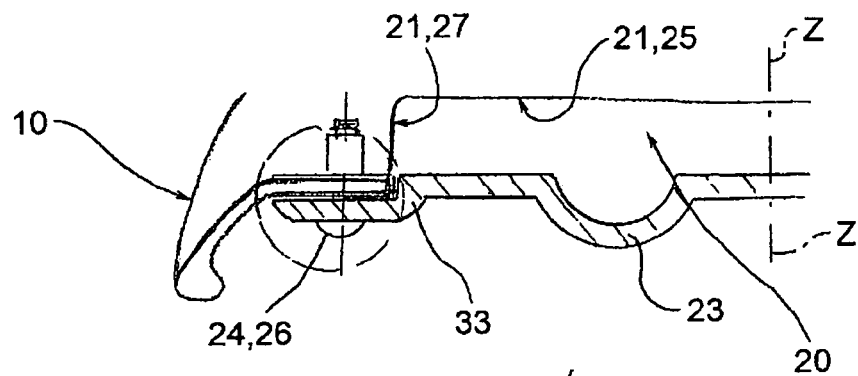
FIG. 1d shows a cross-section view of the saddle in FIG. 1c, along the section plane D-D.
Figure 1C:
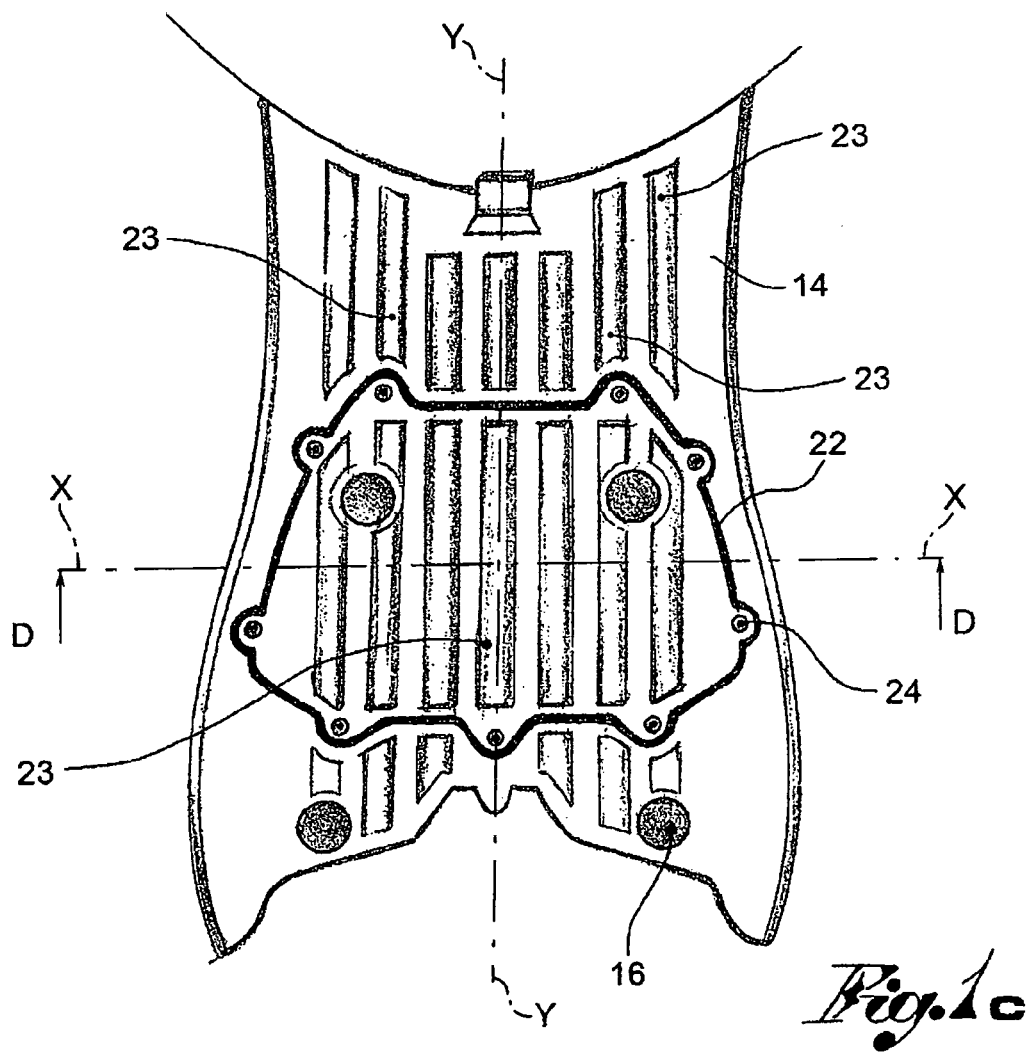
Figure 2A:
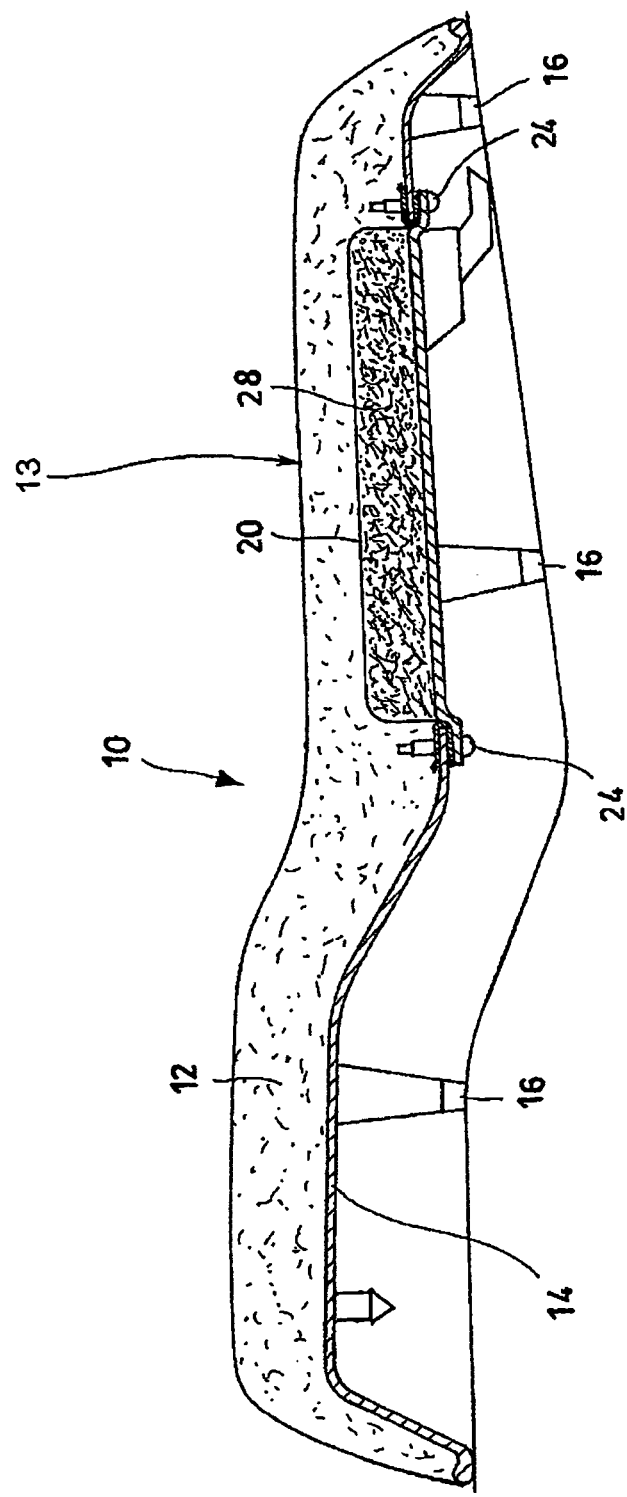
FIGS. 2a-2b show longitudinal cross section views of a saddle according to different embodiments of the present invention.
Figure 2B:
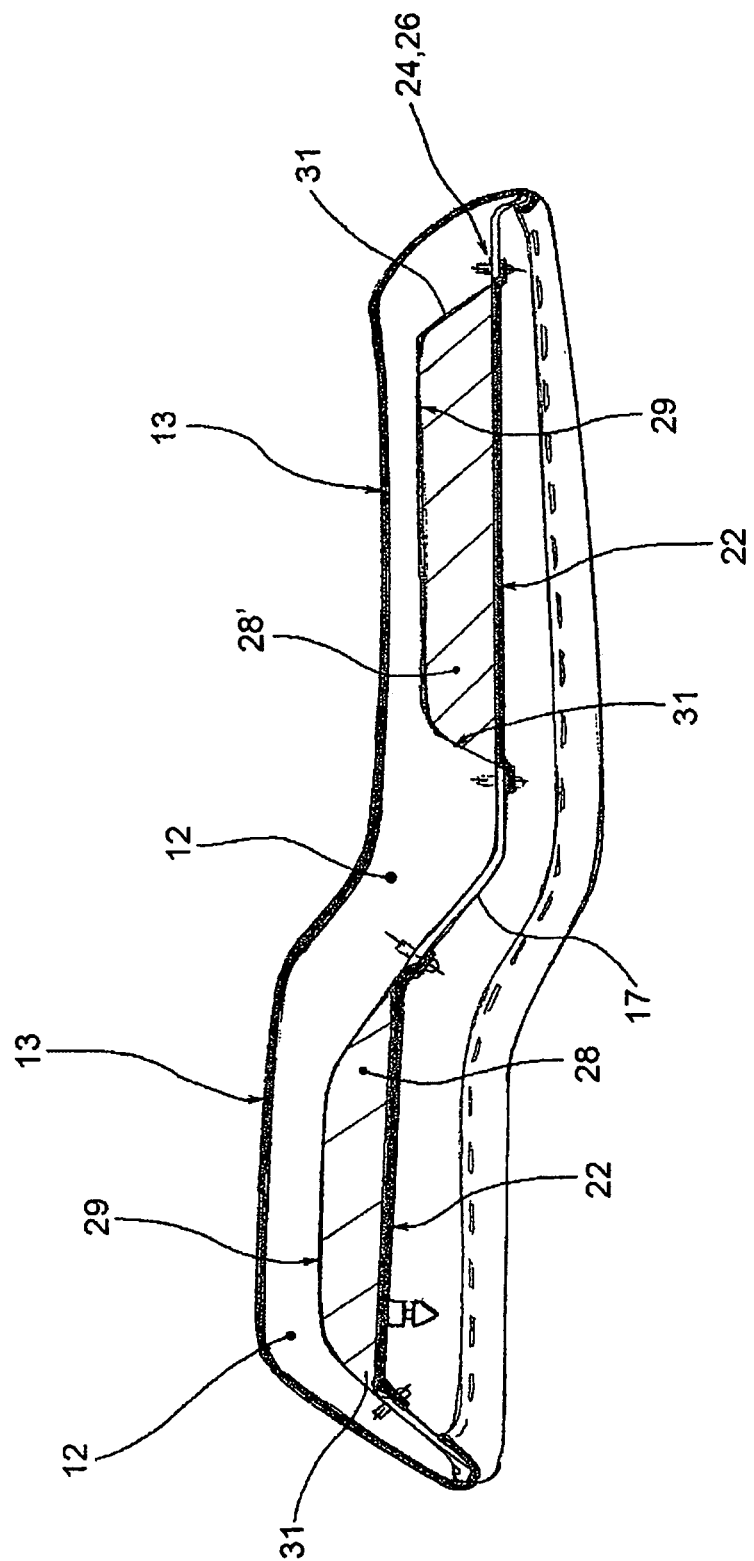

With reference to the figures, some examples of embodiment of the adjustable saddle for motorcycles according to the present invention are globally denoted by reference numeral 10. The saddle 10 comprises, in a manner in itself known, a padded upper portion 12, which constitutes the seat for the rider and/or the passenger, and a substantially rigid bottom portion 14, suitable for resting and attaching the saddle 10 to the chassis or frame of the motorcycle.

The padded upper portion 12 has an overall "U" profile comprising an upper shelf 13 and a pair of lateral sides 15 in relation to a transversal cross-section plane X-X, that is, perpendicular to the direction of movement and vertical to the ground. Said "U" profile interfaces directly with the crotch of the user, whether rider or passenger and is usually covered with a covering layer for example of leather or another material suitable for the purpose.

The upper shelf 13 may be shaped with a substantially rectilinear profile or with a curved profile for example slightly concave or convex. The lateral sides 15 are not necessarily at a perpendicular angle to the upper shelf 13 but are preferably angled so as to be divergent moving from the upper shelf 13 towards the bottom portion 14.

In other words, preferably, the transversal profile of the upper portion 12, delineated by the upper shelf 13 and by the lateral sides 15, is shaped overall like an isosceles triangle so as to adapt to the ergonomic conformation of the crotch of the user.

In relation to a longitudinal cross-section plane Y-Y, that is parallel to the direction of movement and perpendicular to the transversal plane X-X, the saddle 10 may have a substantially rectilinear or even curvilinear profile, preferably outwardly concave, that is to say towards the user.

In relation to a longitudinal cross-section plane Y-Y, the saddle may even have two separate upper portions 12',12" suitable for respectively accommodating the rider and the passenger; such separate upper portions 12' and 12" may be positioned at different levels and may be connected to each other by means of a connection portion 17.

The bottom portion 14 of the saddle 10 is fitted, underneath, with one or more support buffers 16 destined to come into contact with the chassis or frame of the motorcycle.

On the bottom portion 14 of the saddle 10 at least one aperture 18 is made for access to a respective compartment 20 made inside the padded upper portion 12 and destined to receive any inserts 28, as will be specified further below. The aperture 18 is conveniently made at the seat of the rider and/or passenger. The shape and dimensions of the aperture 18, just as the shape and dimensions of the respective compartment 20, are variable depending on the type of saddle 10.

The aperture 18 is conveniently provided with a removable cover plate 22, fitted with reversible means of attachment 24 to the bottom portion 14 of the saddle 10. The cover plate 22 thus has the function of selectively opening and closing the aperture 18 and the respective compartment 20 made on the bottom of the saddle 10. Once the cover plate 22 has been removed it is therefore possible to access the compartment 20 to insert, add and/or remove special inserts 28 or kits for customising the comfort or height of the saddle 10.

The cover plate 22, when constrained to the bottom portion 14 of the saddle 10, as well as supporting the inserts or kits previously mentioned, also ensures the structural rigidity of such bottom portion 14.

According to a possible embodiment, the cover plate 22 comprises a perimetral rim or step 33 which is countershaped to the perimeter of the aperture 18 of the bottom portion 14, so as to form a centring of the cover plate 22 in relation to the aperture 18.

In addition such perimetral rim 33 constitutes a stiffening both for the cover plate 22 and for the bottom portion 14 at its aperture 18. In fact, the perimetral rim forms a constraint to the deformation or bending of the bottom portion where it is at its most mechanically weak portion on account of said aperture 18. The stiffening of the bottom portion is important given that it must be possible to repeatedly open and dismantle the saddle over time, subjected to different loads with different inserts 28 without on such account losing its characteristics of rigidity, mechanical coupling and ergonomics.

The cover plate 22 may also be fitted with some of the support buffers 16 destined to come into contact with the chassis or frame of the motorcycle.

The cover plate 22 may be attached on the same plane as the bottom portion 14, or laid over such bottom portion 14. Preferably, the reversible means of attachment 24 of the cover plate 22 to the bottom portion 14 of the saddle 10 may consist of:

- self-tapping screws which screw directly into special attachment holes predisposed on the bottom portion 14 of the saddle 10;
- metric screws which screw onto threaded clips 26 positioned on the perimetral rim of the aperture 18 made on the bottom portion 14;
- snap-fit portions or hinges with hook fastening on fast opening pushbutton or key-operated lock.

Alternatively to the threaded clips 26, for the attachment of the cover plate 22, co-moulded threaded inserts may be provided.

The attachment of the cover plate 22 by means of metric screws is useful for ensuring correct closure over time and the endurance of the attachment of said plate to the bottom portion 14 of the saddle 10.

To make the cover plate 22 stand out and make it immediately recognisable injected plastic materials may be used, or die-cut materials with particular technical and aesthetic characteristics. Alternatively, a sheet of metal may be used to manufacture the cover plate 22, making the desired shape by laser cutting or by means of a special die.

Preferably, the cover plate is provided with reinforcement ribs 23 which increase the thickness as well as bending rigidity thereof; the reinforcement ribs 23 may be directed in a longitudinal or transversal direction; the reinforcement ribs 23 may protrude externally, that is one the side opposite the compartment 20 so as to be visible from the outside or preferably, the reinforcement ribs 23 may protrude internally, that is towards the compartment 20 so as not to be visible from the outside. This latter configuration is preferred give that often, at the cover plate 22 of the saddle 10, the associable motorcycle frame has passages for wiring and/or aeration ducts. As a result, it is preferable not to increase the lower dimensions of the cover plate 22 so as not to modify in any way the space available under said saddle.

As mentioned above, the compartment 20 is made inside the padded upper portion 12, more precisely, inside the cushion in foam material (generally polyurethane foam) with which such padded upper portion 12 is normally manufactured. The dimensions in height, length and width of the compartment 20 depend on the type of saddle 10 (for scooter, on road motorcycle, off road motorcycle etc) and on the overall thickness of the saddle 10 itself.

According to an embodiment of the invention, the height of the compartment 20, measured, in a vertical direction Z-Z perpendicular to said longitudinal Y-Y and transversal X-X directions, is equal to at least 10% of the overall height of the padded upper portion 12.

According to an embodiment of the invention, the height the compartment 20, measured in a vertical direction Z-Z perpendicular to said longitudinal Y-Y and transversal X-X directions, is equal to not more than 70% of the overall height of the padded upper portion 12. This way a margin of padding of the padded upper portion 12 is always ensured so as to guarantee the comfort of the user.

According to another embodiment of the invention, the compartment 20 passes completely through the padded upper portion 12. In this way, the insert 28 is covered laterally but not on the upper side by the padded upper portion.

Advantageously, the compartment 20 is in turn counter-shaped to the rim of the upper portion 12: in other words, an inner side wall 21 of the compartment follows the outer profile of the padded upper portion 12. In particular, the inner side wall 21 of the compartment 20 follows the outer profile of the padded upper portion 12 both in a longitudinal direction Y-Y and in a transversal direction X-X.

Preferably, the inner side wall 21 thus comprises an upper wall 25, joined to the upper shelf 13, and a pair of side walls 27 joined to the side walls 15 of the upper portion 12.

This way the compartment 20 proves substantially counter-shaped to the outer profile of the upper portion 12 of the saddle 10.

The fact that the profile of the inner side wall 21 of the compartment 20 is counter-shaped to the profile of the upper portion 12 ensures a geometric and dimensional control of the overall profile of the saddle with the varying of the inserts 28.

In other words, the counter-shaping of the profile of the inner side wall 21 of the compartment 20 and the profile of the upper portion 12 means that the profile of the upper portion 12 remains unchanged as the overall thickness of the saddle 10 varies; in other words again, the profile of the upper portion 12 changes, increasing or decreasing, parallel to itself, depending on the presence or absence of the insert 28.

The absence of an insert or the use of an insert 28 having smaller dimensions than that of the compartment 20 thus permits a reduction of the overall dimensions of the saddle 10.

In addition the use of an insert having larger dimensions than that of the compartment 20 permits an increase in the overall dimensions of the saddle.

Any variation to the dimensions of the saddle is not limited to a variation in height of the seat, that is to say, of the upper shelf 13 but extends to the lateral sides 15; this way by increasing the height of the seat the sides 15 are also thickened and the portion of the saddle receiving the crotch is filled. In addition by reducing the dimensions of the saddle not only is the height of the seat, that is to say, of the upper shelf 13 reduced but the lateral sides 15 are also shrunk.

The result is that the ergonomics of the saddle is not altered by modifying the inserts 28 given that the overall profile of the upper portion 12 shifts parallel to itself without changing the proportions; in addition, nor does the overall appearance of the saddle change which maintains its original shape decided by the project designer.

The alteration of the thickness of the sides 15 simultaneously with the height of the upper shelf 13 thus makes it possible to progressively and ergonomically vary the portion of saddle which interfaces with the crotch of the user. The profile of the saddle 10 remains the same, increasing or decreasing overall depending on the user's requirements.

On account of the presence of the compartment 20, the foam material which the padded upper portion 12 of the saddle 10 is manufactured from can be made with superior technical and resistance characteristics compared to those of the foam material which "standard" saddles are manufactured from.

The insert insertable in the compartment 20 through the aperture 18 may vary in shape, dimensions and technical characteristics from one saddle to another. Generally speaking, the shape of the insert corresponds to the shape of the compartment 20 made in the foam material of the padded upper portion 12 of the saddle 10, while the height of such insert may vary as needed.

Preferably, the insert 28 is in turn counter-shaped to the profile of the padded upper portion 12 both in a longitudinal direction Y-Y and in a transversal direction X-X. in other words, preferably, the insert 28 also comprises an upper base portion 29 joined or counter-shaped to the upper shelf 13 and a pair of lateral chamfers 31 counter-shaped or joined to the lateral sides 15.

The insert 28 is mechanically separate from the cover plate 22: in other words, the insert is laid on an inner side of the cover plate but is lacking any anchorage or attachment to the cover plate 22. This way it is possible, after removing the cover plate 22, to easily remove the insert 28 replacing it with another having different dimensions, shape and rigidity but it is also possible to insert objects between the insert and the plate; in other words, it is possible to insert the insert against the inner side wall 21 of the compartment 20 and then use the space present between the insert and the plate to insert, for example, small objects.

In addition it is possible to have a single cover plate 22 and a plurality of interchangeable inserts 28 as needed.

Figure 3:
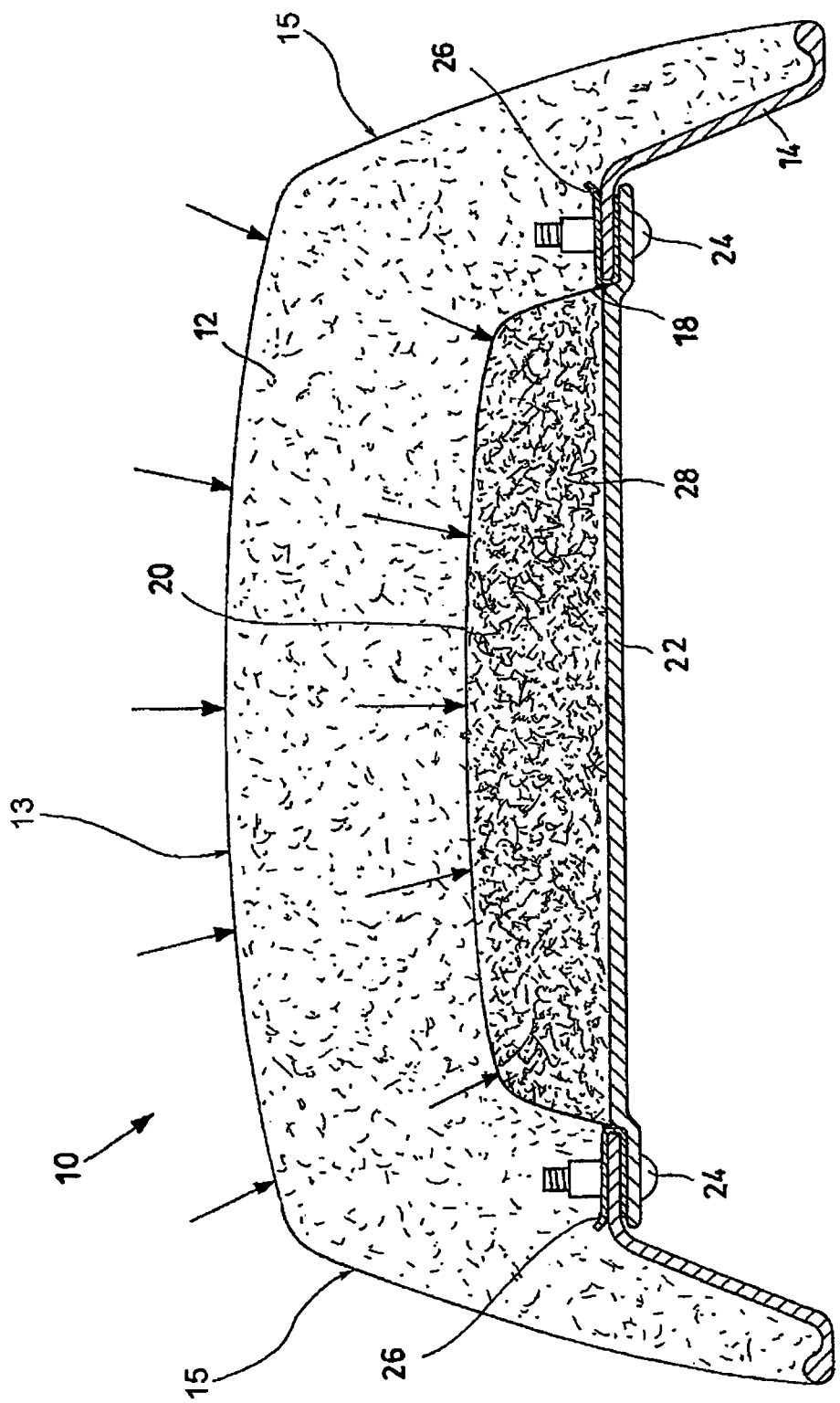

The inserts may consist of components and material of various types, as shown in the figures from 3 to 10. FIG. 3 shows one embodiment of the saddle 10 wherein an insert 28 is contained in the compartment 20 made with a foam material having a lower density and/or hardness compared to the density and/or hardness of the foam material with which the padded upper portion 1 of the saddle 10 is manufactured. One may thereby obtain a lowered saddle 10, in that the pressure exerted by the rider and/or passenger, once seated, permits a lowering of the padded upper portion 12 in the direction indicated by the arrows in FIG. 3. The lowered configuration of the saddle 10 may also be obtained when no type of insert is contained in the compartment 20.

Figure 4:
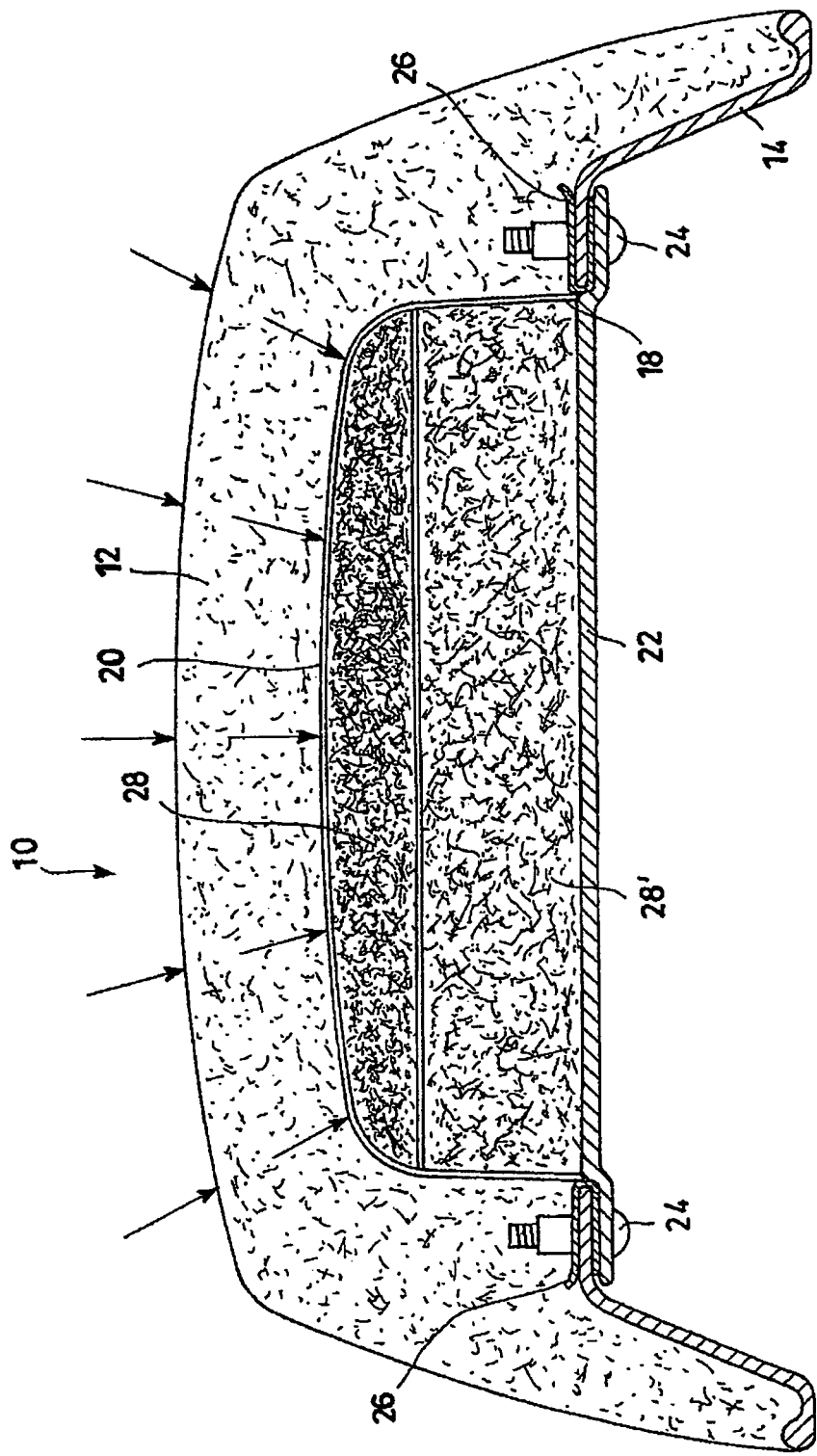

FIG. 4 shows another embodiment of the saddle 10 which permits a lowered position. In such case, an insert 28 in foam material having a lower height than the height of the compartment 20 may be contained in said compartment 20, or two different inserts 28 and 28' may be contained having different density and/or hardness from each other and in any case inferior to the density and/or hardness of the foam material with which the padded upper portion 12 of the saddle 10 is, manufactured.

Figure 5:
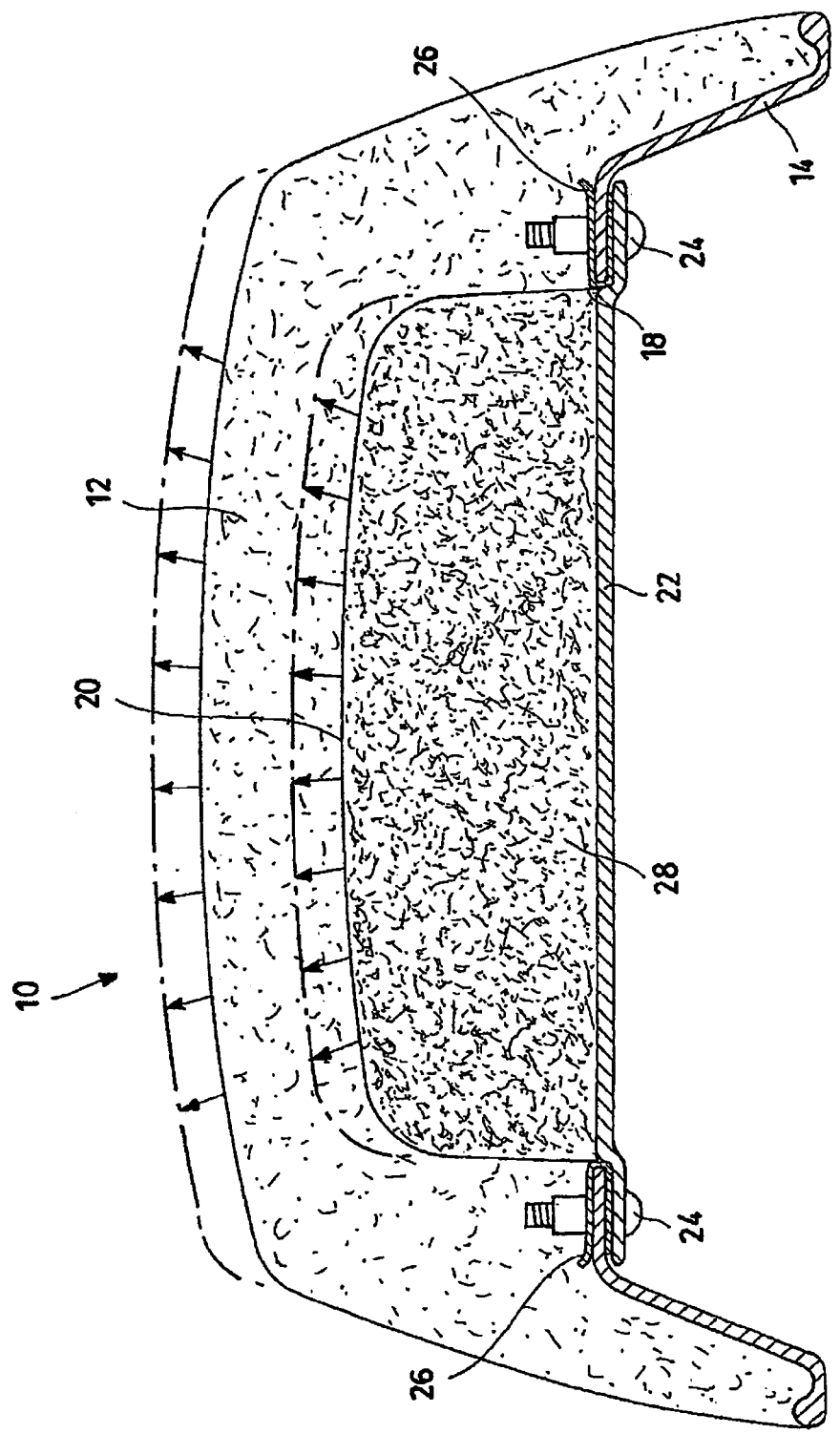

FIG. 5 shows an embodiment of the saddle 10 which permits a raised position. In such case, one or more inserts 28 in foam material having overall a greater height than the height of the compartment 20 may be contained in said compartment 20. Alternatively, such insert or inserts 28 may have a different density and/or hardness from each other and in any case superior to the density and/or hardness of the foam material with which the padded upper portion 12 of the saddle 10 is manufactured.

In general, the inserts 28 in foam material may be made in various shapes and may typically consist of:
  die-cut inserts from sheets, using commercial or specifically designed material;
  foam materials manufactured by injection, using commercial or specifically designed material;

inserts manufactured as specified above, made with different densities/hardness, height and shapes to ensure optimal comfort;

inserts made at least partially with a solid elastic colloidal material (gel);

elastic compression shape memory inserts;

inserts moulded with a chemical bi-component.

The type or material of the inserts 28 may thus vary at will, it being possible to use all those materials having the technical characteristics and shape needed to achieve the specific objectives of comfort or height of the saddle 10, as shown for example in FIG. 11A-11D.

Figure 6:
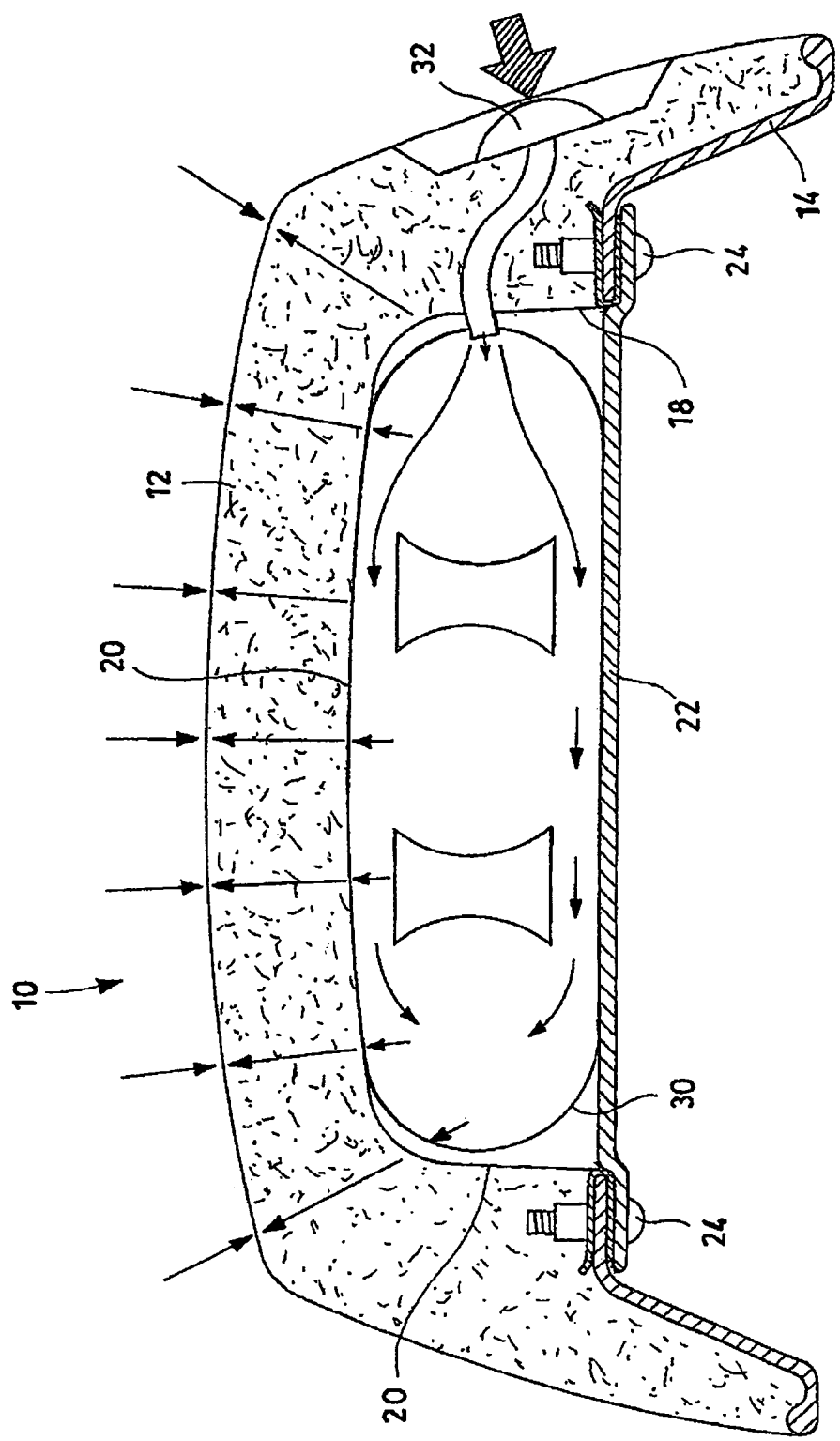

FIG. 6 shows an embodiment of the saddle 10 in which the lowered or raised position is achieved by means of an inflatable cushion or device 30 suitable for inserting inside the compartment 20. By regulating the inflation pressure of the cushion 30 the height of the seat may be increased or reduced and the level of comfort varied (harder or softer saddle). The cushion 30 may be inflated by a special valve 32 accessible from the padded upper portion 12 of the saddle 10. Alternatively, the valve 32 may be made on the cover plate 22 of the compartment 20.

Figure 7:
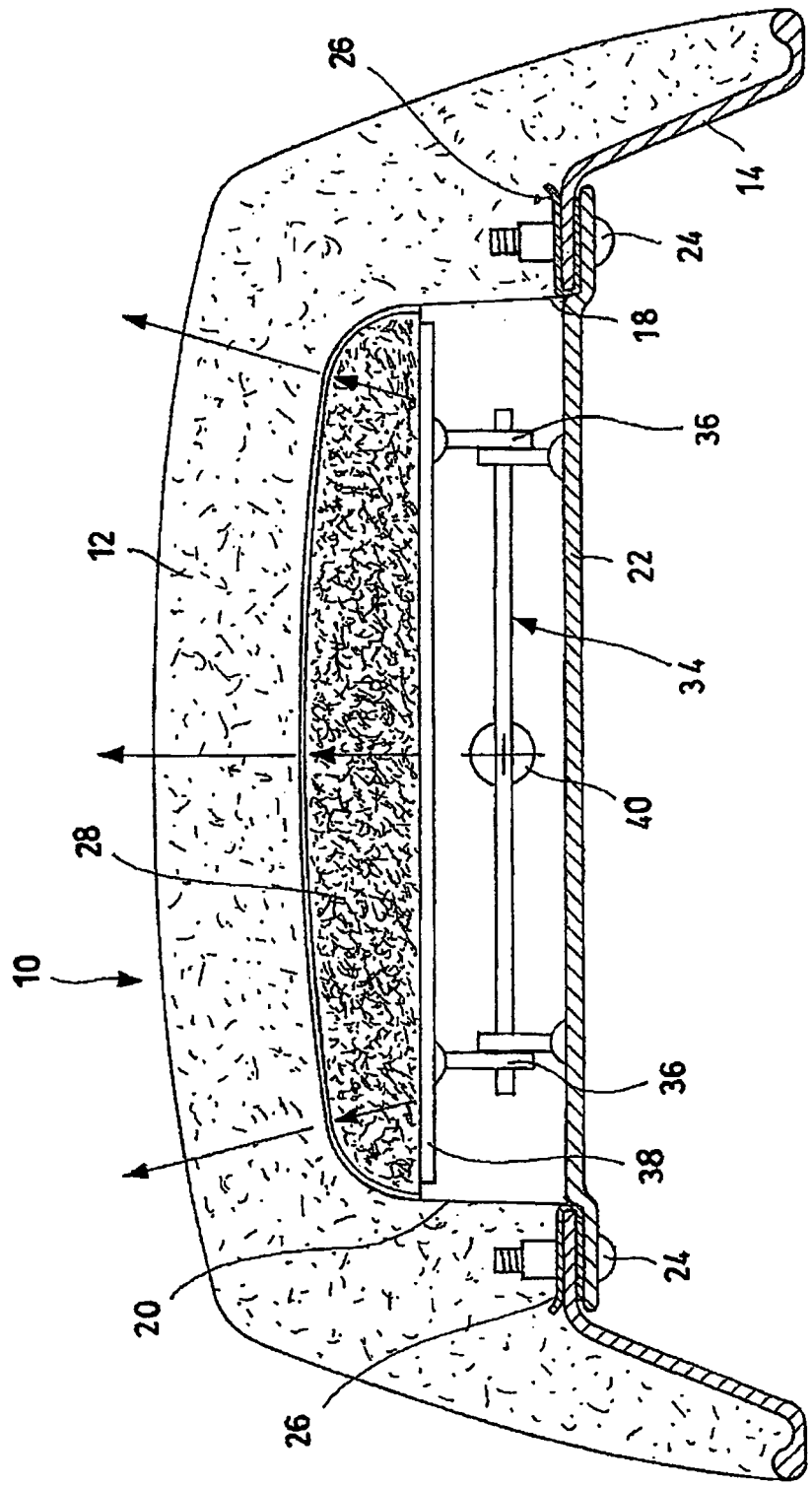

FIG. 7 shows another embodiment of the saddle 10 in which the lowered or raised position is achieved by means of a mechanical lifting device 34 suitable for inserting inside the compartment 20. The mechanical lifting device 34 is composed of special toggle levers 36 which act on a lifting plate 38 and which are operated by means of one or more worms 40. An insert 28 in foam material may be applied above the lifting plate 38 in contact with the padded upper portion 12 of the saddle 10 for reasons of comfort. The movement height-wise of the lifting plate 38 and of the relative insert 28 in foam material thus determines the raising or lowering of the padded upper portion 12 of the saddle 10. The adjustment of the mechanical lifting device 34 may be manual or electric.

Figure 8:
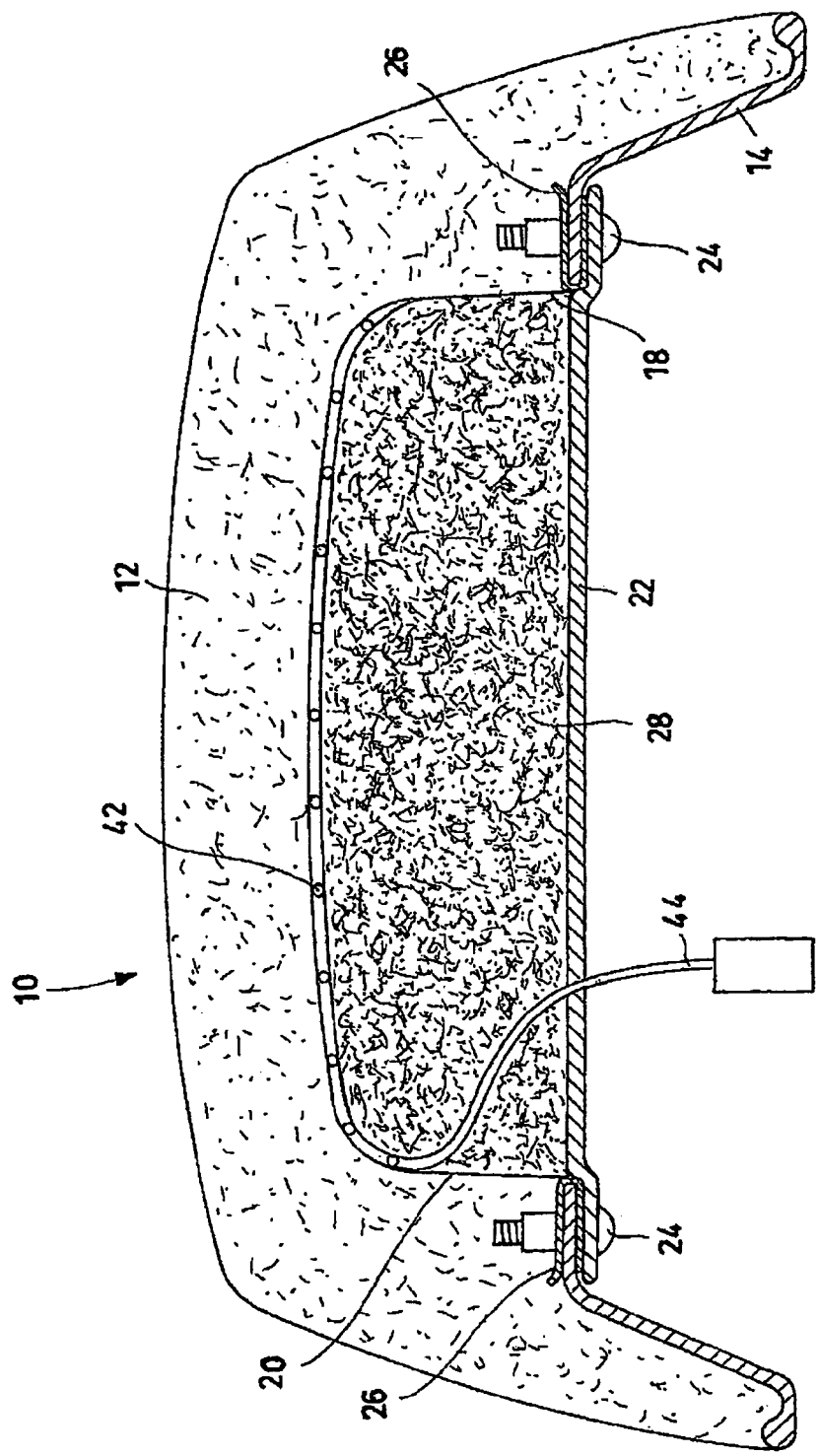

FIG. 8 shows an embodiment of the saddle 10 permitting a variation of the level of comfort of the rider and/or passenger of the motorcycle. In such embodiment the insert 28 in foam material is fitted internally or externally with an electric resistor. The electric resistor 42 is provided with a relative wiring 44 which permits its activation/disactivation by the rider of the motorcycle. The electric resistor 42 is thus able to heat the padded upper portion 12 of the saddle 10 to ensure an adequate level of comfort in the winter season.

Figure 9:
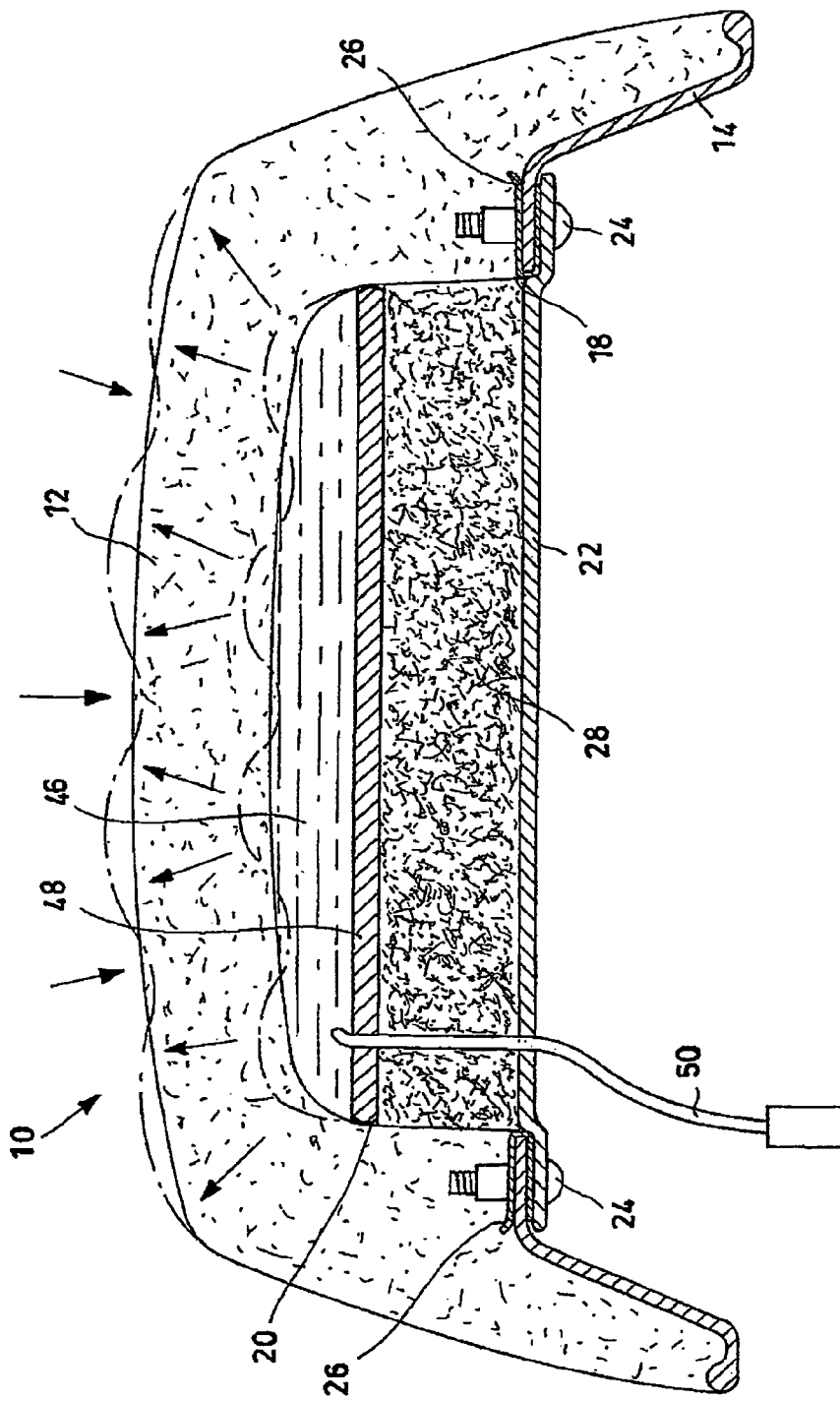

FIG. 9 shows another embodiment of the saddle 10 permitting a variation of the level of comfort of the rider and/or passenger of the motorcycle. In such embodiment an electric massage device 46 which acts in contact with the padded upper portion 12 of the saddle 10 is inserted in the compartment 20. The electric massage device 46 is supported in abutment by a rigid insert 48 and may be optionally combined with an insert 28. The electric massage device 46 is provided with a relative wiring 50 which permits its activation/disactivation by the rider of the motorcycle.

Alternatively to the above, other devices may be inserted inside the compartment 20, such as for example water mattresses of suitable size and shape, cooling devices and so forth. Inside the compartment 20 two different devices and/or inserts 28 may even be inserted contemporarily.

The padded upper portion 12 of the saddle 10 may be covered on the outside with a waterproof bi-elastic textile or, alternatively, with commercial materials of various type and design, suitable for ensuring the various functional aspects of the saddle 10, especially as regards the protection of the devices and/or inserts 28 positioned inside the compartment 20. The covering of the padded upper portion 12 of the saddle 10 may have the same technical characteristic as the covering of the saddle first fitted, or may be made in a different manner so as to offer a higher quality product.

Figure 12B:
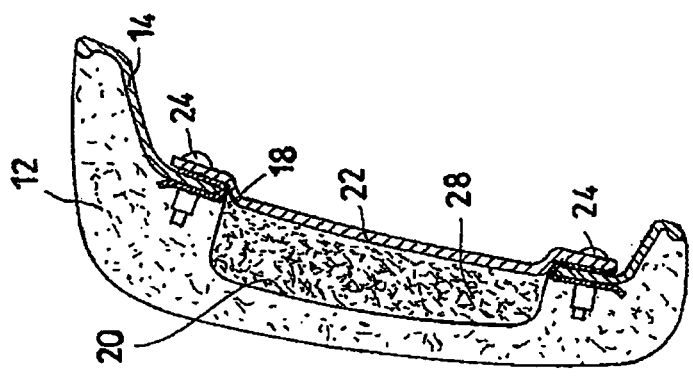
FIGS. 12A and 12B show a backboard, for top cases or for backrests, for use with the adjustable saddle for motorcycles according to the present invention and provided with the same technical expedients.
Figure 12A:
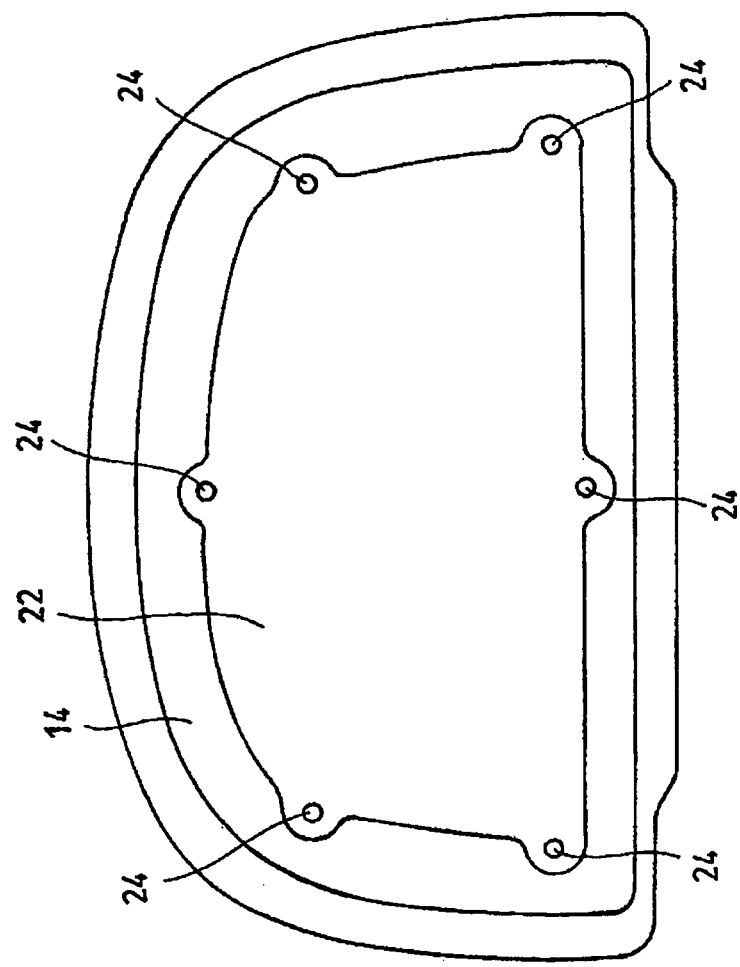

FIGS. 12A and 12B lastly illustrate the application of the innovative technical characteristics of the present invention to a padded back board, which constitutes a very widespread accessory of saddles for motorcycles. In general, therefore, the innovative technical characteristics of the present invention may also be applied in an equivalent manner to backboards for top cases, backrests, saddles and seats of two or three-wheeled motor vehicles and to seats of various types.

It has thus been seen that the adjustable seat for motorcycles according to the present invention achieves the purposes highlighted above. The adjustable seat for motorcycles according to the present invention makes it possible to intervene in a simple and intuitive manner by means of the cover plate made on the bottom of the saddle. The operation, which may be performed directly by the user, makes it possible to have a single saddle with multiple customised solutions for obtaining a customised level of comfort.

The adjustable saddle for motorcycles of the present invention thus conceived is susceptible in any case to numerous modifications and variations, all falling within the same inventive concept; in addition all the parts may be replaced by technically equivalent elements. In practice the materials used, as well as the shapes and dimensions may be varied according to technical requirements.

The sphere of protection of the invention is consequently defined.

The invention claimed is:

1. Adjustable saddle for motorcycles comprising a padded upper portion, which constitutes a seat for at least one of a rider or a passenger, and a substantially rigid bottom portion, suitable for resting and attaching the saddle to a chassis or to a frame of the motorcycle, wherein on said bottom portion comprises at least one aperture connecting to a respective compartment positioned inside the padded upper portion and contains one or more means suitable for varying at least one of a height of the seat or a level of comfort for the at least one of the rider or the passenger of the motorcycle, said at least one aperture being made at the seat of the at least one of the rider or the passenger and being provided with a removable cover plate, fitted with at least one reversible means of attachment to said bottom portion to selectively open and close said at least one aperture and the respective compartment so as to at least one of insert, add or remove said means; wherein the padded upper portion has an overall "U" profile comprising an upper shelf and a pair of lateral sides in relation to a transversal cross-section plane, that is, perpendicular to a direction of movement and vertical to a ground, and that the compartment comprises an inner side wall which follows an outer profile of the padded upper portion both in a longitudinal direction and in a transversal direction so that the inner side wall of the compartment proves counter-shaped to the outer profile of the padded upper portion.

2. Adjustable saddle according to claim 1, wherein the inner side wall comprises an upper wall, joined to the upper shelf, and a pair of side walls joined to the side walls of the upper portion.

3. Adjustable saddle according to claim 1, wherein the upper shelf has a rectilinear or curved profile and wherein the pair of lateral sides are angled so as to be divergent moving from the upper shelf towards the bottom portion.

4. Adjustable saddle according to claim 1, wherein the saddle, in relation to a longitudinal cross-section plane, that is parallel to the direction of movement and perpendicular to the transversal plane, has a curved profile, outwardly concave, towards a user.

5. Adjustable saddle according to claim 1, wherein a height of the compartment, measured in a vertical direction, perpendicular to said longitudinal and transversal directions, is equal to at least 10% of an overall height of the padded upper portion.

6. Adjustable saddle according to claim 1, wherein a height of the compartment, measured in a vertical direction, perpendicular to said longitudinal and transversal directions, is equal to and not more than 70% of an overall height of the padded upper portion.

7. Adjustable saddle according to claim 1, wherein said means suitable for varying the at least one of the height of the seat or the level of comfort for the at least one of the rider or the passenger of the motorcycle, comprise an insert counter-shaped to the profile of the padded upper portion both in a longitudinal direction and in a transversal direction.

8. Adjustable saddle according to claim 7, wherein the insert comprises an upper base joined or counter-shaped to the upper shelf of the upper portion, and a pair of side chamfers counter-shaped or joined to the side walls of the upper portion.

9. Adjustable saddle according to claim 7, wherein the insert is mechanically separate from the cover plate, such that the insert is laid on an inner side of the cover plate but is lacking any anchorage or attachment to the cover plate.

10. Adjustable saddle according to claim 1, wherein the cover plate is provided with reinforcement ribs which increase a thickness as well as bending rigidity thereof.

11. Adjustable saddle according to claim 10, wherein the reinforcement ribs protrude internally towards the compartment so as not to be visible from the outside.

12. Adjustable saddle according to claim 1, wherein the cover plate comprises a perimeter rim or step which is counter-shaped to the perimeter of the aperture of the bottom portion, so as to form a centering of the cover plate in relation to the aperture and to stiffen the cover plate at said aperture.

13. Adjustable saddle according to claim 1, wherein said means suitable for varying the at least one of the height of the seat or the level of comfort for the at least one of the rider or the passenger of the motorcycle, comprise at least one insert manufactured with a foam material and having a different height from a height of said compartment.

14. Adjustable saddle according to claim 1, wherein said means suitable for varying the at least one of the height of the seat or the level of comfort for the at least one of the rider or the passenger of the motorcycle, comprise an insert manufactured with a foam material having at least one of a different density or a different hardness from the at least one of a density or a hardness of the material with which said padded upper portion is manufactured.

15. Adjustable saddle according to claim 1, wherein said means suitable for varying the at least one of the height of the seat or the level of comfort for the at least one of the rider or the passenger of the motorcycle, comprise two different inserts made from foam materials having at least one of a different density or a different hardness from each other and in relation to the at least one of a density or a hardness of the foam material with which said padded upper portion is manufactured.

16. Adjustable saddle according to claim 1, wherein said means suitable for varying the at least one of the height of the seat or the level of comfort for the at least one of the rider or the passenger of the motorcycle, comprise an inflatable device or cushion able to increase or reduce the height of the seat by regulating an inflation pressure.

17. Adjustable saddle according to claim 1, wherein said means suitable for varying the at least one of the height of the seat or the level of comfort for the at least one of the rider or the passenger of the motorcycle, comprise a mechanical lifting device fitted with toggle levers which act on a lifting plate and which are operated by one or more worms.

18. Adjustable saddle according to claim 17, wherein above said lifting plate an insert in foam material is applied, placed in contact with the padded upper portion for reasons of comfort.

19. Adjustable saddle according to claim 1, wherein said padded upper portion is covered on the outside with a waterproof bi-elastic textile, so as to protect said means suitable for varying the at least one of the height of the seat or the level of comfort for the at least one of the rider or the passenger of the motorcycle positioned inside said compartment.

* * * * *